United States Patent
Esteve-Subirana

[11] 3,873,606
[45] Mar. 25, 1975

[54] SULFONE SALTS DERIVING FROM 2,5-DIHYDROXY BENZENE MONOSULFONIC AND 2,5-DIHYDROXY BENZENE DISULFONIC ACIDS

[75] Inventor: Antonio Esteve-Subirana, Barcelona, Spain

[73] Assignee: Laboratories del Dr. Esteve S.A., Geneva, Switzerland

[22] Filed: May 14, 1973

[21] Appl. No.: 359,772

[52] U.S. Cl..... 260/512 C, 260/512 R, 260/501.21, 260/501.19, 424/315, 424/316
[51] Int. Cl............................................ C07c 143/42
[58] Field of Search....... 260/512 R, 512 C, 501.21, 260/501.19

[56] References Cited
UNITED STATES PATENTS
2,943,097  6/1960  Beachem .......................... 260/396

FOREIGN PATENTS OR APPLICATIONS
913,177  6/1954  Germany .......................... 260/396

OTHER PUBLICATIONS
Stecher et al., "The Merck Index," 8th ed., p. 1178 (1968).

Primary Examiner—Bernard Helfin
Assistant Examiner—Nicky Chan
Attorney, Agent, or Firm—Hume, Clement, Brinks, Willian, Olds & Cook, Ltd.

[57] ABSTRACT

Sulfone salts deriving from 2,5-dihydroxy benzene monosulfonic and 2,5-dihydroxy benzene disulfonic acids have the general formula:

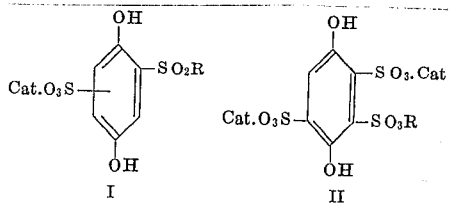

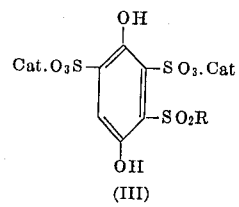

wherein R is an aryl, alkylaryl or aralkyl radical, and B represents a cation of an alkali metal, an alkaline-earth meta of ammonium, of an amine, substituted or un-substituted, open chained or cyclic, and are remarkable for their hemostatic, hypocholesteremic, hypotriglycidemic and hypolipidemic activity.

5 Claims, No Drawings

SULFONE SALTS DERIVING FROM 2,5-DIHYDROXY BENZENE MONOSULFONIC AND 2,5-DIHYDROXY BENZENE DISULFONIC ACIDS

This invention is directed to novel sulfone salts deriving from 2,5-dihydroxybenzene monosulfonic and 2,5-dihydroxybenzene disulfonic acids, as well as a process for preparing them. These compounds have the general formulae:

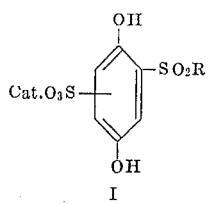 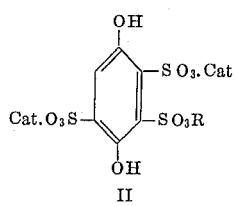

I  II

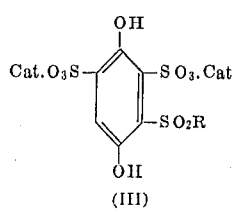

(III)

wherein R is an aryl, alkylaryl or aralkyl radical, and B represents a cation of an alkali metal, alkaline-earth metal, ammonium or of a substituted or unsubstituted amine, e.g. alkanolamines, alkyl- and arylamines, cyclic amines, etc.

The process according to the invention for preparing compounds having the general formulas I, II and III is characterized in that a salt of quinone mono- or disulfonic acid having the formula:

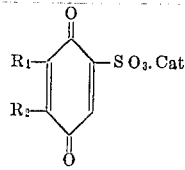

is reacted with an acid of formula: R—SO$_2$H where, when R$_1$ is hydrogen, R$_2$ can be hydrogen or —SO$_3$.B, and when R$_1$ is —SO$_3$.B, R$_2$ is hydrogen. R has the meaning above-defined.

The starting quinones are obtained from the corresponding hydroquinones by oxidizing with nitric acid in aqueous or alcoholic medium, as described in the following Examples.

This process is based upon the HINSBERG reaction for forming sulfones by addition of sulfinic acids to quinones. In this process, one uses, for the first time, quinonesulfonic acids which, by reacting with substituted sulfinic acid, produce sulfones of hydroquinone sulfonic acids, no examples whereof are known, at the present date, in the chemical litterature.

Preferably the reaction is carried out in aqueous or aqueous-alcoholic medium, and generally using an alkali metal salt of quinone sulfonic acid. In this way the reaction is successfully carried out in a homogenous medium, and the alkali metal salt of the sulfone of hydroquinone sulfonic acid is readily obtained. The great stability and water solubility of the produce obtained allows it to be separated from the solution previously rendered colourless with active charcoal, by evaporating to dryness, using preferably vacuum distillation.

The residual oil solid is treated with ethanol and the desired product precipitates in a substantially white state.

The following Examples illustrate the invention.

EXAMPLE 1

Preparation of the potassium salt of 2,5-dihydroxy-3,6-disulfon-4'-methyl-diphenylsulfone:

A slurry of 11 gr of p-toluenesulfinic acid in 100 ml of water is placed in a 250 ml Erlenmeyer. To this slurry 25 gr of potassium p-quinone-2,5-disulfonate are added, and stirring is maintained for 4 hours. The water is vacuum-evaporated, and the residual oil is poured on 200 ml of ethanol. A precipitate is formed, which is collected on a filter, and is washed with ethanol and ether. 29 gr of the 2,5-dihydroxy-3,6-disulfo-4'-methyldiphenylsulfone potassium salt are obtained. The infrared spectrum recorded in a KBr pellet gives maxima at the following frequencies: 1410, 1220, 1150, 1020, and 655 cm$^{-1}$.

EXAMPLE 2

2,5-dihydroxy-4-sulfo-4'-methyldiphenylsulfone sodium salt 160 gr of p-toluensulfinic acid in 1000 ml of water are slurried in a 3 liter beaker provided with strong mechanical stirring means, and 208 gr of sodium quinone sulfonate are added gradually. The stirring is maintained during four hours, and the water is vacuum-evaporated. The residue is treated with ethanol, and it is then collected on a filter and washed with ethanol and ethyl ether. 277 gr of the sodium salt of 2,5-dihydroxy-4-sulfo-4'-methyldiphenylsulfone are obtained. The infra-red spectrum recorded in a KBr pellet gives maxima at the following frequencies: 3220, 1425, 1225, 1200, 1120, 1040, 890, and 670 cm$^{-1}$.

EXAMPLE 3

2,5-dihdroxy-4,6-disulfo-4'-methyldiphenylsulfone potassium salt 22 gr of p-toluenesulfinic acid in 200 ml of water are slurried in a 500 ml beaker provided with strong mechanical stirring means, and 50 gr of potassium p-quinone-2,6-disulfonate are added gradually. Stirring is continued for 5 hours, and then the water is vacuum evaporated. The resulting product is treated with ethanol and ethyl ether and 60 gr of the potassium salt of 2,5-dihdroxy-4,6-disulfo-4'-methyldiphenylsulfone are obtained. The infrared spectrum recorded with a KBr pellet gives maxima at the following frequencies: 3440, 3220, 1415, 1220, 1200, 1090, 1040, 890, 820, 705, and 660 cm$^{-1}$.

The starting materials used in these Examples can be obtained as follows: Sodium quinone sulfonate:

90 ml of concentrated nitric acid and 90 ml of absolute ethanol are placed in a 2 liter beaker provided with mechanical stirring means. 300 gr of sodium 2,5-dihydroxy benzene sulfonate are added gradually, and more ethanol is added as required by the reaction, i.e. up to 300 ml.

Stirring is continued for half an hour, and at the end of this period the precipitate formed is collected on a filter, and it is washed with ethanol and ethyl ether.

260 gr of sodium p-quinone sulfonate are obtained. Potassium quinone sulfonate:

20 ml of concentrated nitric acid and 20 ml of water are placed in a 100 -dihydroxybenzene ml vessel. 30 gr of potassium 2,5-dihrosybenzone disulfonate are added gradually. It is stirred for half an hour, and filtered, and the solid is washed with ethanol and ethyl ether. 25 gr of potassium p-quinone sulfonate are obtained.

EXAMPLE 4

2,5-dihydroxy-4-sulfo-4'-methyldiphenyl sulfone calcium salt 5 gr of the sodium salt of 2,5-dihydroxy-4-sulfo-4'-methyldiphenyl sulfone are dissolved in 100 ml of distilled water, and are passed through a column containing 50 gr of strong acid cation resin (LAB I, Merck).

The strongly acid solution obtained is neutralized with calcium carbonate, it is filtered, and evaporated to dryness. The resulting solid is dissolved in alcohol and concentrated. Ethyl ether is added and 4.4 gr of calcium salt of 2,5-dihydroxy-4-sulfo-4'-methyl diphenyl sulfone are obtained.

The infrared spectrum recorded with a KBr pellet gives maxima at the following frequencies: 3410, 1630, 1210, 1150, 1045, and 810 $cm^{-1}$.

EXAMPLE 5

2,5-dihydroxy-4-sulfo-4'-methyl diphenyl sulfone, diethylamine salt:

5 gr of the sodium salt of 2,5-dihydroxy-4-sulfo-4'-methyl diphenyl sulfone are dissolved in 100 ml of distilled water, and are passed through a column containing 50 gr of strong acid cation resin (LAB I, Merck).

The strongly acid solution obtained is neutralized with diethyl amine, filtered, and evaporated to dryness. The residue obtained is dissolved in alcohol, and precipitated with ethyl ether. 3.9 gr of diethylamine salt of the 2,5-dihydroxy-4-sulfo-4'-methyl diphenyl sulfone are obtained, having a melting point of 275°C (dec.). The infrared spectrum recorded with a KBr pellet gives maxima at the following frequencies: 3320, 1420, 1300, 1190, 1140, 1100, 1045, 805, and 655 $cm^{-1}$.

The compounds of general formulae I, II, AND III possess very interesting pharmacodynamical properties, such as hemostatic, and they provide a powerful hypocholesterolemic, hypoglycedemic, and hypolipidic action.

The pharmacodynamical properties of the compounds in accordance with the invention are illustrated by those of the sodium salt of 2,5-dihydroxy-4-sulfo-4'-methyl diphenyl sulfone prepared in Example 2.

1. Acute toxicity in mice and rats 18 to 25 gr albino mice.
100 to 150 gr Sprague-Dawley rats.
The $LD_{50}$ was determined by the Reed and Muench method.

TABLE I

| administration | animal | $LD_{50}$ (mg/kg) | trusts limits |
|---|---|---|---|
| Oral | mouse — male | 5250 | (for p=0.95) (6026-4572) |
| Oral | mouse — female | 4950 | (5683-4311) |
| I.V. | mouse — male | 952 | (1046-866) |
| I.V. | mouse — female | 933 | (1031-845) |
| Oral | rat — male | 8200 | (9414-7141) |
| Oral | rat — female | 7650 | (8386-6976) |

2. Action on the average bleeding time

The sodium salt of 2,5-dihydroxy-4-sulfo-4'-methyldiphenyl sulfone, administered intraveinously, produces a lowering of the ABT in the rabbit, determined by ROSKAM's technique, modified by LA-PORTE, (Chemotherapia, 3, 62, 1961). The effects of the product are observed as soon as the 2.5 micromoles/kg does is given, which, 1 hour after administration, reduces the ABT by 14 %. With increasing doses, the effect increases progressively to a maximum of 50 %. The effect of the product remains constant at least until 4 hours after administration; thus, for example, 10 micromoles/kg cause a reduction of the ABT of 31.5 % in the 1st hour, 33 % in the second hour, and 32 % in the 4th hour.

3. Hypolipemic action on the rat

The sodium salt of 2,5-dihdroxy-4-sulfo-4'-methyldiphenyl sulfone significantly inhibits the increase of cholesterol, triglyceride, and total lipids levels in the plasma of Sprague-Dawley rats treated with Triton WR-1339 (Friedmann M, and Byers S. O., J. Exptl Med., 97, 117, 1953). The results obtained in these tests are given in Table II. The amount of Triton WR-1339 administered to the animals in 300 mg/kg. The amount of sodium salt of 2,5-dihydroxy-4-sulfo-4'-methyldiphenyl sulfone administered is 2 mmoles/kg, orally. The letter P means probability.

TABLE II

| | Triton | Triton + 2,5-dihydroxy-4-sulfo-4'-methyldiphenyl-sulfone/salt sodium |
|---|---|---|
| Total cholesterol mg % ml of plasma | 240.7 ± 10.1 | 210.0 ± 8.7 |
| Δ % with respect to Triton | | − 13 % |
| P | | 0.025<P<0.05 |
| Free cholesterol mg % ml of plasma | 61.5 ± 3.9 | 48.9 ± 1.8 |
| Δ % with respect to Triton | | − 20 % |
| | Triton | Triton + 2,5-dihydroxy-4-sulfo-4'-methyl-diphenyl-sulfone/salt sodium |
| P | | 0.005<P<0.001 |
| Triglycerides mg % ml of plasma | 888.2 ± 44.9 | 669.1 ± 25.7 |
| Δ % with respect to Triton | | − 25 % |
| P | | P<0.001 |
| Total lipids mg % ml of plasma | 2833.8 ± 164.9 | 2243 ± 97.0 |
| Δ % with respect to Triton | | − 21 % |
| P | | 0.005<P<0.01 |

The proposed dose for humans is 1 to 2 gr per day. The preferred pharmaceutical forms are tablets and capsules, containing 250 mg or 500 mg of active compound of formula I, II or III per unit.

| Example of formula per tablet | (500 mg dose) | |
|---|---|---|
| 2,5-dihydroxy-4-sulfo-4'-methyl-diphenylsulfone sodium salt | | 0.500 g |
| Rice starch | | 0.100 g |
| Lactose | | 0.100 g |
| Polyvinylpyrrolidone | | 0.020 g |
| Magnesium stearate | | 0.003 g |
| | Weight of tablet | 0.723 g |

| Example of formula per gelule | (500 mg dose) | |
|---|---|---|
| 2,5-dihydroxy-4-sulfo-4'-methyl-diphenylsulfone sodium salt | | 0.500 g |
| Lactose | | 0.100 g |
| Aerosil | | 0.002 g |
| Magnesium stearate | | 0.004 g |
| | Weight of gelule | 0.606 g |

I claim:
1. A compound of formula:

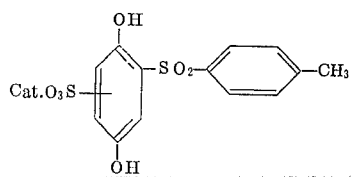

wherein the sulfo group —SO$_3$.cat is selected from those in the meta and para position to the sulfone group, and wherein cat is selected from the group consisting of an alkali metal cation, an equivalent of an alkaline earth metal cation, the ammonium ion.

2. The compound of claim 1 in which cat is an alkali metal cation.

3. The compound of claim 1 in which cat is a sodium cation.

4. The compound of claim 1 in which cat is an alkaline earth metal cation.

5. The compound of claim 1 in which cat is the calcium cation.

* * * * *

UNITED STATES PATENT OFFICE
CERTIFICATE OF CORRECTION

Patent No. 3,873,606    Dated March 25, 1975

Inventor(s)  Antonio Esteve-Subirana

It is certified that error appears in the above-identified patent and that said Letters Patent are hereby corrected as shown below:

Abstract, Formula II, "$SO_3R$" should read -- $SO_2R$ --.

Abstract, 6 lines from end: "B" should read -- Cat --.

Column 1, lines after 10, Formula II: "$SO_3R$" should read -$SO_2R$ --.

Column 1, line 25, "B" should read -- Cat --.

Column 1, line 43, "-$SO_3B$" should read -- -$SO_3 \cdot Cat$ --.

Column 1, line 44, "-$SO_3B$" should read -- -$SO_3 \cdot Cat$ --.

Column 1, line 55, "litterature" should read -- literature --.

Column 1, line 63, "produce" should read -- product --.

Column 2, line 66, "dihydrosy" should read -- dihydroxy --.

Column 4, line 3, "does" should read -- dose --.

Claim 1, next to last line, before "the ammonium," insert -- and --.

Signed and Sealed this

Third Day of May 1977

[SEAL]

Attest:

RUTH C. MASON
Attesting Officer

C. MARSHALL DANN
Commissioner of Patents and Trademarks